(12) United States Patent
Fahndrich

(10) Patent No.: US 7,820,267 B2
(45) Date of Patent: Oct. 26, 2010

(54) PERCUSSION DRILLED SHAPED THROUGH HOLE AND METHOD OF FORMING

(75) Inventor: Marc Fahndrich, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 279 days.

(21) Appl. No.: 11/841,261

(22) Filed: Aug. 20, 2007

(65) Prior Publication Data
US 2009/0053464 A1    Feb. 26, 2009

(51) Int. Cl.
B32B 3/24       (2006.01)
B23K 26/38    (2006.01)

(52) U.S. Cl. ............... 428/131; 219/121.7; 219/121.73; 415/115; 416/96 A; 416/96 R; 416/97 A; 416/97 R

(58) Field of Classification Search ............... 416/97 R, 416/96 A, 96 R, 97 A; 415/115
See application file for complete search history.

(56) References Cited

U.S. PATENT DOCUMENTS

| | | | | |
|---|---|---|---|---|
| 3,698,834 A | * | 10/1972 | Meginnis ................... | 416/96 R |
| 3,700,418 A | * | 10/1972 | Mayeda ....................... | 28/613 |
| 4,672,727 A | | 6/1987 | Field | |
| 4,684,323 A | * | 8/1987 | Field ........................ | 416/97 R |
| 4,738,588 A | * | 4/1988 | Field ........................ | 416/97 R |
| 4,819,325 A | * | 4/1989 | Cross et al. .................... | 29/825 |
| 4,923,371 A | * | 5/1990 | Ben-Amoz ................ | 416/97 R |
| 5,093,548 A | * | 3/1992 | Schmidt-Hebbel ..... | 219/121.71 |
| 5,392,515 A | * | 2/1995 | Auxier et al. .......... | 29/889.721 |
| 5,609,779 A | * | 3/1997 | Crow et al. ............ | 219/121.71 |
| 5,683,600 A | | 11/1997 | Kelley et al. | |
| 5,747,769 A | | 5/1998 | Rockstroh et al. | |
| 6,004,100 A | * | 12/1999 | Przirembel et al. ........ | 416/97 R |
| 6,241,468 B1 | | 6/2001 | Lock et al. | |
| 6,307,175 B1 | | 10/2001 | Blochlinger et al. | |
| 6,383,602 B1 | * | 5/2002 | Fric et al. ................... | 428/131 |

(Continued)

FOREIGN PATENT DOCUMENTS

JP          10006059          1/1998

(Continued)

OTHER PUBLICATIONS

European Search Report for Application No. EP 08162416.5, dated Dec. 15, 2008.

*Primary Examiner*—David R Sample
*Assistant Examiner*—Jeff A Vonch
(74) *Attorney, Agent, or Firm*—Ingrassia Fisher & Lorenz, P.C.

(57) ABSTRACT

A percussion drilled shaped through hole formed between a first surface and a second surface of a component and a method of forming the through hole. The through hole is defined by a primary crater, a secondary crater, and a metering hole. The primary crater is formed using laser percussion drilling in the first surface of the component. The secondary crater is formed using laser percussion drilling within the primary crater and substantially offset from a centerline of the primary crater. The metering hole is formed using laser percussion drilling within the secondary crater and extending through the component to the second surface. The primary crater, the secondary crater, and the metering hole define a Coandă ramp and provide for the flow of fluid through the percussion drilled shaped through hole according to the Coandă effect.

9 Claims, 3 Drawing Sheets

U.S. PATENT DOCUMENTS

| | | | |
|---|---|---|---|
| 6,420,677 | B1 | 7/2002 | Emer et al. |
| 6,504,274 | B2 * | 1/2003 | Bunker et al. ............... 310/64 |
| 6,573,474 | B1 | 6/2003 | Loringer |
| 6,603,095 | B2 | 8/2003 | Hamann |
| 6,624,382 | B2 | 9/2003 | Kling |
| 6,630,645 | B2 | 10/2003 | Richter et al. |
| 6,706,996 | B2 | 3/2004 | Wybrow et al. |
| 6,744,010 | B1 | 6/2004 | Pepe et al. |
| 6,781,091 | B2 | 8/2004 | Byrd et al. |
| 6,914,214 | B2 | 7/2005 | Byrd et al. |
| 6,918,742 | B2 * | 7/2005 | Liang ..................... 415/115 |
| 7,019,257 | B2 | 3/2006 | Stevens |
| 2003/0059297 | A1 | 3/2003 | Stagg |
| 2003/0091432 | A1 | 5/2003 | Byrd et al. |
| 2003/0152460 | A1 * | 8/2003 | Haselbach ............. 416/97 R |
| 2005/0023249 | A1 * | 2/2005 | Kildea ................... 219/69.17 |
| 2006/0073017 | A1 * | 4/2006 | Manning et al. ........ 416/97 R |
| 2006/0104807 | A1 * | 5/2006 | Lee ......................... 415/115 |
| 2007/0119832 | A1 | 5/2007 | Beck et al. |

FOREIGN PATENT DOCUMENTS

| | | |
|---|---|---|
| JP | 2000141069 | 5/2000 |

* cited by examiner

PERCUSSION DRILLED SHAPED THROUGH HOLE AND METHOD OF FORMING

TECHNICAL FIELD

The present invention relates to the fabrication of a shaped through hole in a component, and more particularly relates to percussion drilling of a shaped through hole in a component of a gas turbine engine.

BACKGROUND

Components in a gas turbine engine may be exposed to relatively high temperatures and thus are often cooled. One cooling method that is often used is effusion cooling. With effusion cooling, a thin film of air may enter the component through cooling through holes formed in the component. The thin film of air removes heat by conduction and by preventing hot gases from impinging upon the component. Many times effusion cooled components, and more particularly the through holes themselves, tend to become obstructed when operated in certain environments. Thus, larger diameter through holes are sometimes used to prevent blockage. When using these larger diameter through holes, the hole density decreases to minimize total flow to cool the component. This decrease in hole density tends to create an irregular cooling pattern in the form of hot spots. This may also increase the occurrence of the cooling fluid mixing with hot gases and reduce protection of the component. Convective cooling within the through hole is further reduced as the wetted internal area decreases at constant flow when the through hole diameter is increased. All these factors can reduce the overall cooling effectiveness of the component.

Effusion through holes are also typically drilled at a shallow angle to reduce penetration and dilution of the cooling film into the hot gases. This phenomenon is enhanced when the cooling flow exhibits a high relative velocity relative to the ambient hot gases. A classical remedy to this problem is to slow the exiting cooling flow by diffusing it before it enters the hot gas area. Such diffusing through holes have been produced in the past by a variety of methods including laser percussion drilling, various forms of electric discharge machining, laser trepanning, or combinations thereof. While generally effective, these methods can create jets that retain a significant normal velocity component moving the cooling film away from the wall. Curved shaped cooling holes produced by EDM have been proposed but remain an expensive method to create an effusion cooling film on a component of a gas turbine engine.

Accordingly, there is a need for low cost percussion drilled shaped through hole and method of fabrication that provides for efficient cooling of the component.

BRIEF SUMMARY

There has now been developed a percussion drilled shaped through hole comprising a structure including a first surface and a second surface; and a plurality of effusion cooling holes extending between the first and second surfaces, each effusion cooling hole comprising: a primary crater formed in the first surface of the component; a secondary crater, formed within the primary crater, and substantially offset from a centerline of the primary crater; and a metering hole formed within the secondary crater and extending through the component to the second surface. The primary crater, the secondary crater, and the metering hole define a Coandă ramp and provide for the flow of fluid through the percussion drilled shaped through hole according to the Coandă effect.

In yet another embodiment, by way of example only, there is provided a method of forming a shaped through hole in a component between a first surface and a second surface thereof, the method comprising the steps of: laser percussion drilling a primary crater in the first surface of the component, the primary crater including a centerline; laser percussion drilling a secondary crater within the primary crater, the secondary crater substantially offset from the centerline of the primary crater; and laser percussion drilling a metering hole within the secondary crater and extending through the component to the second surface. The primary crater, the secondary crater, and the metering hole define a Coandă ramp and provide for the flow of fluid through according to the Coandă effect.

In a further embodiment, still by way of example only, there is provided a method of forming a shaped through hole in a component of a gas turbine engine between a first surface and a second surface thereof, the method comprising the steps of: laser percussion drilling a primary crater in the first surface of the component, the primary crater including a centerline; laser percussion drilling a secondary crater within the primary crater, the secondary crater substantially offset from the centerline of the primary crater, and having a depth greater than the primary crater, and a diameter less than the primary crater; and laser percussion drilling a metering hole within the secondary crater and extending through the component to the second surface. The primary crater, the secondary crater, and the metering hole define a Coandă ramp and provide for the flow of fluid through according to the Coandă effect.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described percussion drilled shaped through hole and method of forming the shaped through hole is not limited to use in conjunction with a gas turbine jet engine, and more particularly a combustor sidewall. Thus, although the description is explicitly directed toward percussion drilled shaped through holes formed in a combustor sidewall of a gas turbine engine, it should be appreciated that the shaped through holes and method of forming the shaped through holes can be used in any type of component where a through hole is desired to enable the passage of a fluid through a component, including those known now or hereafter in the art.

Figure 1:
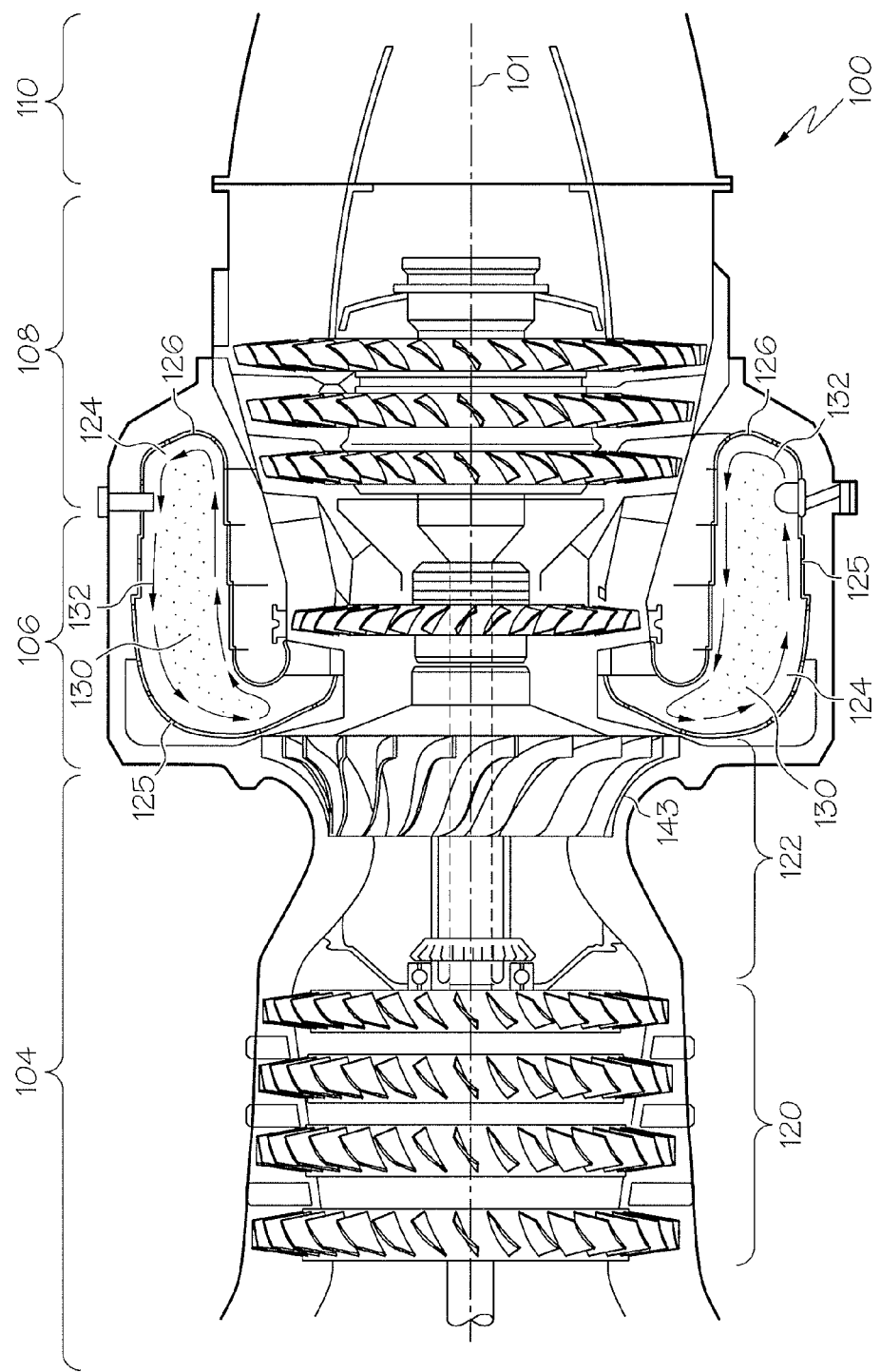
FIG. 1 is a gas turbine engine component including a plurality of percussion drilled shaped through holes formed therein.

Referring now to FIG. 1, an exemplary embodiment of a portion of a turbofan gas turbine jet engine 100 is depicted and includes a compressor section 104, a combustion section 106, a turbine section 108, and an exhaust section 110. In FIG. 1, only half the structure is shown, it being substantially rotationally symmetric about a centerline and axis of rotation 101. During operation, an intake section (not shown) draws air into the turbofan gas turbine jet engine 100 and accelerates it toward the compressor section 104.

The compressor section 104 includes two compressors, an intermediate pressure compressor 120, and a high pressure compressor 122. The intermediate pressure compressor 120 raises the pressure of the air directed into it and directs the compressed air into the high pressure compressor 122. A high pressure impeller 143 compresses the air and directs the high pressure air into the combustion section 106.

In the combustion section 106, which includes a combustor 124, the high pressure air is mixed with fuel and combusted. The combustor 124 receives the high pressure air from the compressor section 104 and mixes it with fuel to generate combusted air. The combusted air is then directed into the turbine section 108.

In the combustor 124, hot gases 130 are generated resulting in a hot operating environment. To enable operation in such a hot environment, a cooling air flow is provided, and will be referred to herein as a thin film cooling airflow 132. As illustrated in FIG. 1, to generate this thin film cooling airflow 132 a plurality of percussion drilled shaped through holes 125 are drilled in a sidewall 126 of the combustor 124. These through holes 125 provide an entrance for the thin film cooling airflow 132 and aid in reducing penetration and dilution of the thin film cooling airflow 132 into the hot gases 130. The thin film cooling airflow 132 forms a thin cooling film over an interior surface of the combustor 124.

Figure 2:
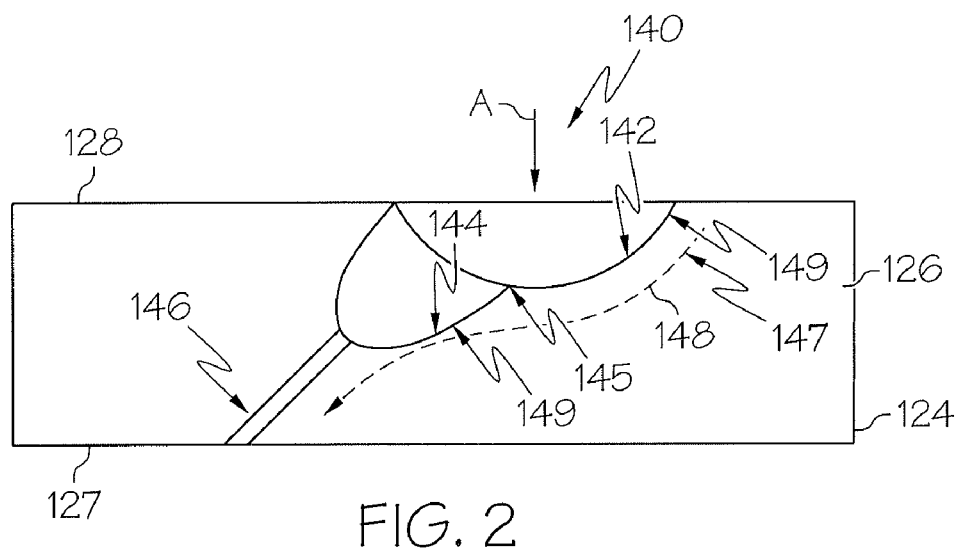
FIG. 2 is a cross-section taken through line 2-2 of FIG. 1, illustrating the geometry of a percussion drilled shaped through hole.

Referring now to FIG. 2, illustrated is a cross-section taken through line 2-2 of FIG. 1, illustrating the geometry of a single percussion drilled shaped through hole 140, of the plurality of percussion drilled shaped through holes 125. It should be understood that any number of shaped through holes may be formed dependent upon the design of the component in which they are formed. In this particular embodiment, the percussion drilled shaped through hole 140 comprises a primary crater 142, a secondary crater 144 and a metering hole 146. The percussion drilled shaped through hole 140 provides communication between an internal surface 127 and an external surface 128 of the sidewall 126 of the combustor 124. In an alternative embodiment, the percussion drilled shaped through holes 125 may provide communication between any two surfaces of a solid wall of a component.

The primary crater 142 is initially formed in the external surface 128 to create a shallow non-perforating crater. The secondary crater 144 is formed to create a deeper non-perforating crater of a smaller diameter than the primary crater 142. The metering hole 146 provides for metering of the flow of thin film cooling air 132 passing through. The primary crater 142, the secondary crater 144 and the metering hole 146 are shaped to provide for the flow of thin film cooling air 132 according to the Coandă effect, as generally illustrated by arrow 148. More specifically, the Coandă effect, also known as boundary layer attachment, causes the thin film cooling air 132 to stay attached to a convex surface 149 such as that created by the primary crater 142 and the secondary crater 144, rather than follow a straight line in its original direction such as has been previously done in the art. In this particular embodiment, the primary crater 142 and the secondary crater 144 form a diffusion section 145 resulting in a diffused flow of the thin film cooling air 132. The diffusion section 145 is curved in a manner to form a Coandă ramp 147 and enable the diffused flow of the thin film cooling air 132 to attach to the component sidewall via the Coandă effect. It should be understood that although the through hole 140 is described herein as being comprised of the primary crater 142, the secondary crater 144 and the metering hole 146, in an alternative embodiment additional craters of diminishing size may be formed to create a gradual ramp suitable for attachment of the flow via the Coandă effect.

Figure 3:
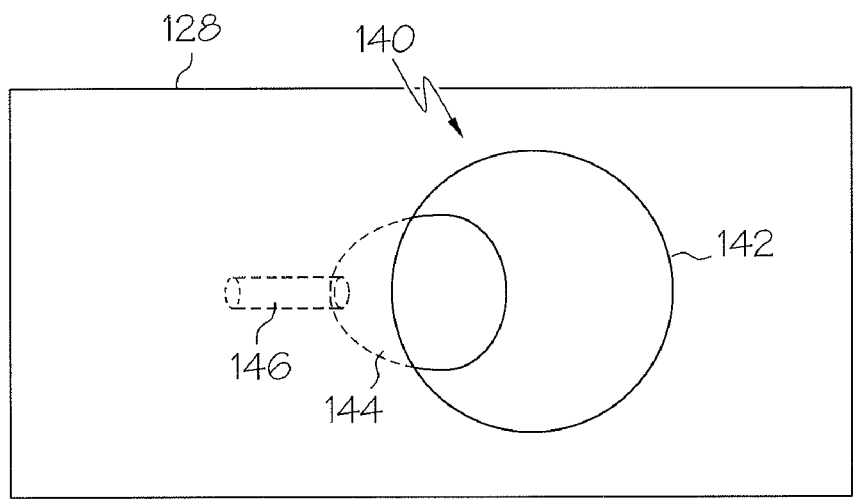
FIG. 3 is a top view taken at A of FIG. 2 illustrating the structure of a percussion drilled shaped through hole.

FIG. 3 illustrates a view along the bore of the percussion drilled shaped through hole 140 and provides further illustration of the geometry of each of the percussion drilled shaped through holes 125. As illustrated, the primary crater 142 provides an entrance through the external surface 128 of the sidewall 126 for a cooling fluid, and more particularly thin film cooling air 132. The primary crater 142 is formed generally circular in shape, but is not limited to being circular and may take on other shapes, such as oval, rectangular, or the like. The secondary crater 144 is formed offset from a centerline of the primary crater 142 and is smaller in size and shape. The metering hole 146 may be formed generally offset from a centerline of the secondary crater 144 and provides an exit for the cooling fluid, and more particularly thin film cooling air 132, through the internal surface 127 of the sidewall 126. It should be understood that the terms internal, external, entrance and exit are being used herein to describe directional information, but could be used interchangeably depending on the embodiment being described and the cooling fluid passing through.

Figure 4:
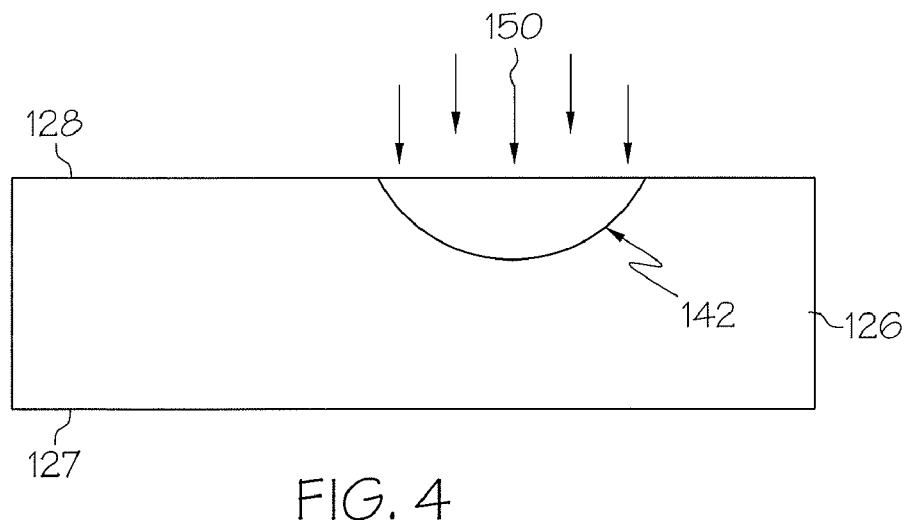
FIGS. 4-6 illustrate steps in the method of forming a percussion drilled shaped through hole of FIGS. 1-3.
Figure 5:
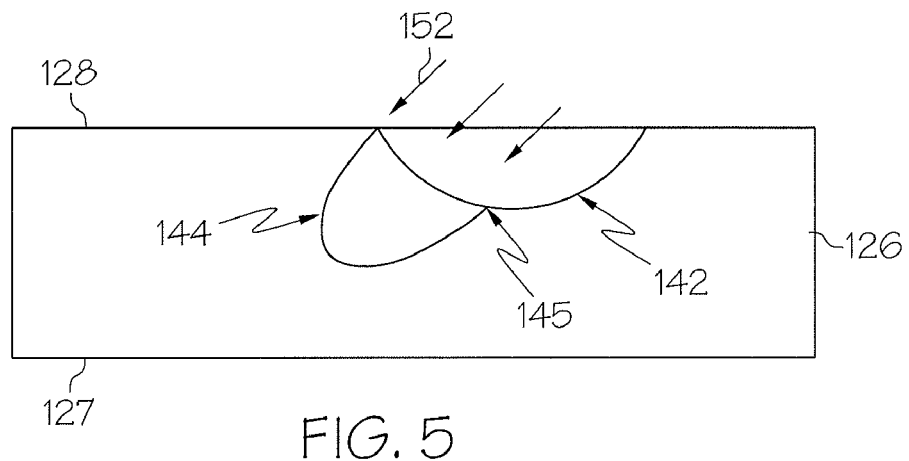
Figure 6:
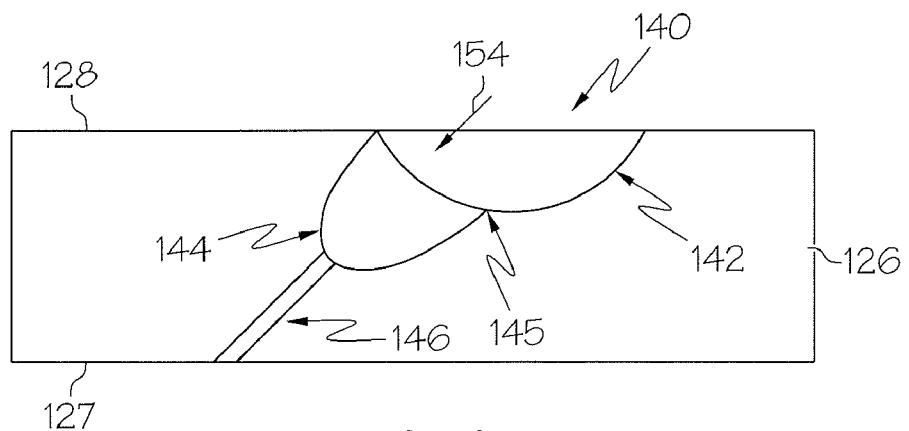

The percussion drilled shaped through hole 140, and more particularly the primary crater 142, the secondary crater 144, and the metering hole 146 are formed using conventional laser percussion drilling as illustrated in FIGS. 4-6. First, as shown in FIG. 4, a broad high pulse or series of pulses, using a highly defocused pulsed laser beam 150 is directed to the component sidewall 126. The use of a defocused pulsed laser beam 150 provides control of the area of the component sidewall 126 that is struck by the coherent radiation of the laser 150. The pulsed laser beam 150 delivers the pulses in a direction substantially normal to the component sidewall 126. As shown in FIG. 4 the energy of the pulsed laser beam 150 ablates material from the component sidewall 126 such that a crater begins to form. The crater becomes progressively deeper with each pulse to form a shallow non-perforating crater, and more particularly the primary crater 142. The pulses from the pulsed laser beam 150 may be arranged in a pattern such as to form a substantially elliptical shape, which is repeated until the primary crater 142 is formed. Optimum drilling conditions are achieved by controlling the duration of the pulses, the pauses between pulses, the pulse energy and beam orientation relative to the surface of the part.

Next, as best illustrated in FIG. 5, a second potentially lower energy pulse or series of pulses, using a pulsed laser beam 152 having a focus closer than that of the pulsed laser beam 150, is directed to the component sidewall 126. The pulsed laser beam 152 delivers the pulse or pulses at a shallower angle to the component sidewall 126 than the highly defocused laser beam 150. In a preferred embodiment, the second pulse, or series of pulses, is applied slightly upstream and at an angle of approximately 60°, normal to the component sidewall 126 to form the secondary crater 144 of a smaller diameter than the primary crater 142. As shown in FIG. 5, similar to the first step, the energy of the laser beam 152 ablates material from the component sidewall 126 such that a crater begins to form. The crater becomes progressively deeper with each pulse to form a shallow non-perforating crater, and more particularly the secondary crater 144. By controlling the energy of the laser pulses and controlling the number of pulses delivered the secondary crater 144 is drilled to a predetermined depth.

FIG. 6 illustrates a further step where the metering hole 146 is formed and provides for the flow of the thin film cooling air 132 (FIG. 1) through the component sidewall 126. To form the metering hole 146, a final pulse or series of pulses, using a pulsed laser beam 154 is directed to the component sidewall 126. The pulsed laser beam 154 may deliver the pulse or pulses at a shallower angle to the component sidewall 126 than the previous laser beam 152. In a preferred embodiment, the final pulse, or series of pulses, is applied at a substantially shallow angle, normal to the component sidewall 126 to break through the surface 127 and form the metering hole 146. As shown in FIG. 6, similar to the previous steps, the energy of the beam 154 ablates material from the component sidewall 126 such that a long hole having a diameter less than the previously formed craters 142 and 144 is formed. The metering hole 146 controls the flow of fluid through the percussion drilled shaped through hole 140.

To complete the formation of the percussion drilled shaped through hole 140 any remaining ridges formed by the primary crater 142, the secondary crater 144 and the metering hole 146 are removed by laser drilling to create a proper Coandă ramp.

Accordingly, disclosed is a percussion drilled shaped through hole and a method of forming the shaped through hole wherein the exiting thin film cooling air 132 will have a low normal velocity relative to the component sidewall 126. The diffusing section 145 of the shaped through hole 140 causes the diffused flow of thin film cooling air 132 to attach to the component sidewall 126 using the Coandă effect. The geometry of the shaped through hole 140 can be produced economically by percussion drilling via laser or any other energetic beam machining method.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A component, comprising:
    a structure including a first surface and a second surface; and
    a plurality of effusion cooling holes extending between the first and second surfaces, each effusion cooling hole comprising:
        a primary crater formed in the first surface of the structure, the primary crater having a maximum diameter and a first centerline;
        a secondary crater formed within the primary crater, smaller in size than the primary crater, the secondary crater having a second centerline that forms an angle with the first centerline, a first edge substantially adjacent to the first centerline and located proximate the bottom of the primary crater, a second edge substantially adjacent to an edge of the primary crater and located proximate the first surface, and a maximum diameter less than the maximum diameter of the primary crater; and
        a metering hole formed in the secondary crater and extending through the structure to the second surface.

2. The component of claim 1, wherein the primary crater has an inner surface that is substantially elliptical shaped, as taken in cross-section.

3. The component of claim 1, wherein the secondary crater has an inner surface that is substantially elliptical shaped, as taken in cross-section.

4. The component of claim 1, wherein the primary crater and the secondary crater form a diffusion section to diffuse the flow of a fluid.

5. The component of claim 1, wherein the primary crater is a shallow non-perforating crater.

6. The component of claim 5, wherein the secondary crater is a non-perforating crater having a depth greater than a depth of the primary crater.

7. The component of claim 1, wherein the primary crater, the secondary crater and the metering hole are formed by laser drilling.

8. The component of claim 1, wherein the component is one of a combustor sidewall of a gas turbine engine, a turbine vane, and a turbine blade.

9. The component of claim 4, wherein the fluid is a thin film cooling air.

\* \* \* \* \*